June 25, 1957  H. P. SMITH ET AL  2,796,723
SIDE DELIVERY RAKE
Filed Oct. 6, 1955  2 Sheets-Sheet 1

INVENTORS
HIRAM P. SMITH
KENNETH G. KIRCHNER
Paul O. Pippel
ATTORNEY

June 25, 1957 H. P. SMITH ET AL 2,796,723
SIDE DELIVERY RAKE
Filed Oct. 6, 1955 2 Sheets-Sheet 2

INVENTORS
HIRAM P. SMITH
KENNETH G. KIRCHNER
Paul O. Pippel
ATTORNEY

United States Patent Office 2,796,723
Patented June 25, 1957

2,796,723

SIDE DELIVERY RAKE

Hiram P. Smith, Chicago, Ill., and Kenneth G. Kirchner, Tujunga, Calif., assignors to International Harvester Company, a corporation of New Jersey Application October 6, 1955, Serial No. 538,932

5 Claims. (Cl. 56—377)

This invention relates to side delivery rakes and more particularly to a rake of the type which comprises a plurality of individual raking wheels which are arranged in overlapped relationship and each of said wheels being power driven.

The instant invention is concerned with an improvement of the rake shown in U. S. Patent No. 468,382 and distinguishes over rakes currently in use in that the respective wheels are individually power driven from a ground drive wheel and not through engagement of its teeth with the ground or the hay. In designs wherein the rake wheels are driven through engagement of its teeth with the hay or the ground, dirt is scratched up by the teeth and mixed with the hay so its palatability for the cattle is seriously impaired.

It is an object of the present invention to provide a rake of the type described and more specifically is an object to provide a novel squadron hitch for the rake units so that each unit is floatable vertically with respect to each other unit in accordance with the contour of the terrain.

A more specific object of the invention is to provide a novel hitching arrangement and rake assembly wherein the rake assembly is composed of a plurality of self-sustaining units which may be added or readily subtracted in order to provide a rake of different widths.

A further object of the invention is to provide a novel support for the rake units which includes means for adjusting the fore and aft tilt of the rake wheels.

These and other objects of the invention will become more apparent from the specification and the drawings wherein.

Figures 1, 2, 6:
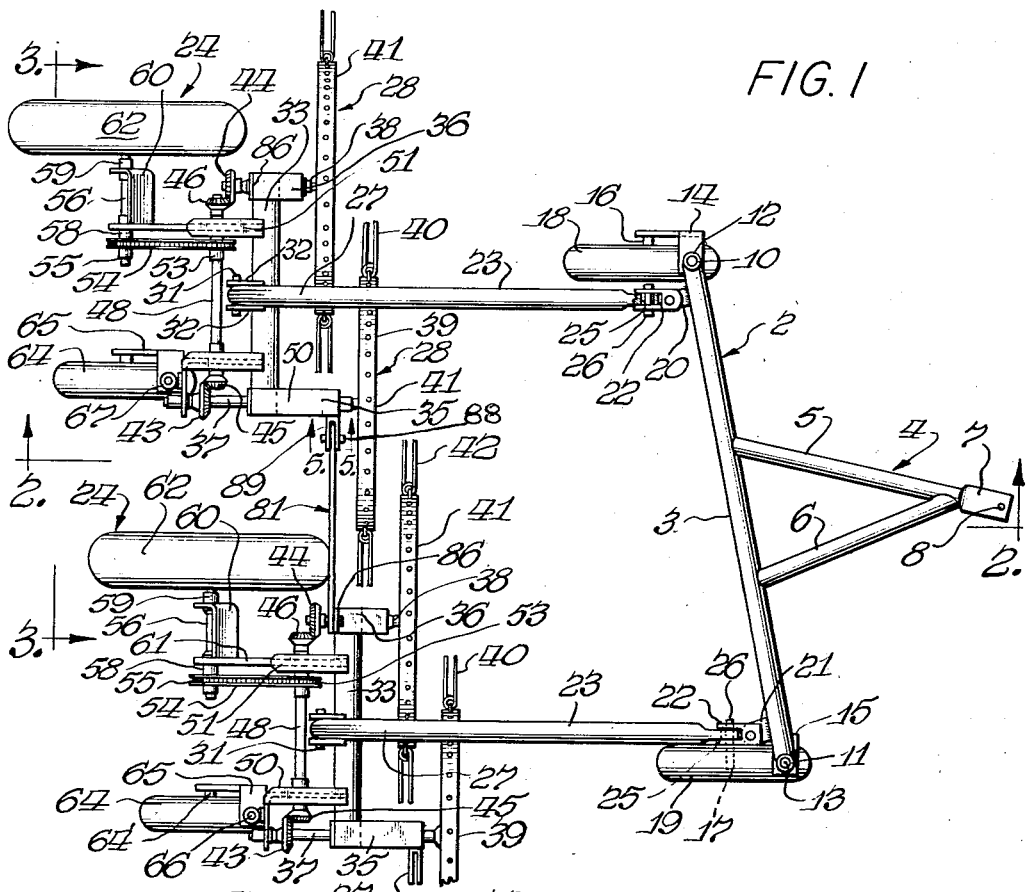
Figure 1 is a plan view of the novel rake and hitch assembly.
Figure 2 is a sectional view with parts broken away taken substantially on the line 2—2 of Figure 1.
Figure 6 is a fragmentary sectional view on line 6—6 of Figure 4.

Describing the invention in detail and having particular reference to the drawings, there is shown a draft frame generally designated 2 which comprises a transverse or cross frame member 3 intermediate the ends of which is connected a hitch frame 4 comprising a pair of beam members 5 and 6 arranged in a rearwardly diverging V and connected at their rear ends to an intermediate portion of the member 3, and at their forward ends being interconnected and integrated with a hitching lug 7 which is provided with an eye 8 adapted for receiving an associated pintle, such as a bolt, which is adapted for connection to a drawbar of a conventional tractor or the like.

The member 3 is provided at opposite ends with substantially vertical tubular sockets 10 and 11 receiving the pintles 12 and 13 of the caster wheel supports 14 and 15 which at their lower ends carry cross shafts 16 and 17 which provide rotary journals for the wheels 18 and 19, respectively. Thus the draft frame structure is provided a wheel support.

Adjacent each end of the member 3 there are provided rearwardly extending lugs 20 and 21 to which are adapted to be connected through clevis members 22 the forward ends of the arch bar frame members 23 of the rake units generally indicated 24.

It will be noted that for purposes of illustration only two identical units 24 are herein shown. Each unit 24 comprises the beforementioned fore and aft extending arch bar frame member 23 which is of an inverted somewhat U shape in side elevation as best seen in Figure 2 and comprises the downwardly and forwardly inclined forward leg portion 24' which at its lower forward end is connected through a loose opening 25 to a pin 26 of the clevis 22 and the upper rearward extremity of the leg 24' merges into the forward end of the bight portion 27 which is disposed at a level above the raking means generally designated 28 and the rear extremity of the bight portion 27 merges into the upper end of a substantially upright rear leg 30 of the arch frame member 23. The lower end of the leg 30 is connected by means of a transverse pin 31 to a pair of rearwardly extending lugs 32 which embrace the same, the lugs 32 being integrally connected with and projecting rearwardly from a substantially horizontal transverse tubular main beam member 33 which is positioned substantially perpendicular to and ahead of the leg 30 of the member 23. The beam member 33 is integrally connected at opposite ends to fore and aft elongated carrier structures 35 and 36 which provide journals for fore and aft extending shafts 37 and 38.

The forward end of the shaft 37 is connected to drive a rotary raking wheel 39 which about its periphery is provided with a plurality of outstanding spring fingers 40 which are adapted to peripherally sweep over the ground there in front attendant to the rake being drawn forwardly. Similarly the forward end of the shaft 38 is connected to a rotary rake wheel 41 which about its periphery is connected to a plurality of radially outwardly extending spring tines 42 which also are adapted to rake the ground and stubble over which it is adapted to pass. It will be observed from a consideration of Figures 1 and 3 that the rake wheels 40 and 41 are overlapped in a direction toward which the hay is to be moved sidewise and that the wheel 41 is disposed slightly rearwardly of the wheel 39 and that both wheels 39 and 41 are arranged substantially perpendicular to the line of travel in distinction to an angular disposition to the line of travel as required by ground driven wheels.

The rear extremities of the shafts 37 and 38 are provided with bevel gears 43 and 44 respectively and these mate with companion bevel gears 45 and 46 which are keyed to a cross shaft 48 which is journaled and carried upon mounting arms 50 and 51 which are at their forward extremities integrally united with the beam member 33 and project rearwardly therefrom, the mounting members 50 and 51 being disposed adjacent to the extremities of the member 33.

The shaft 48 is provided with a sprocket 53 which is driven by chain 54 which meshes with a driving sprocket 55 on a driving countershaft 56, the countershaft 56 being rotatably journaled on bearings 58 and 59 on the bifurcated portion 60 of the lower end of a downward and rearward extension 61 which is connected as by welding to the rearward end of the holder or mounting means 51.

Figure 4:
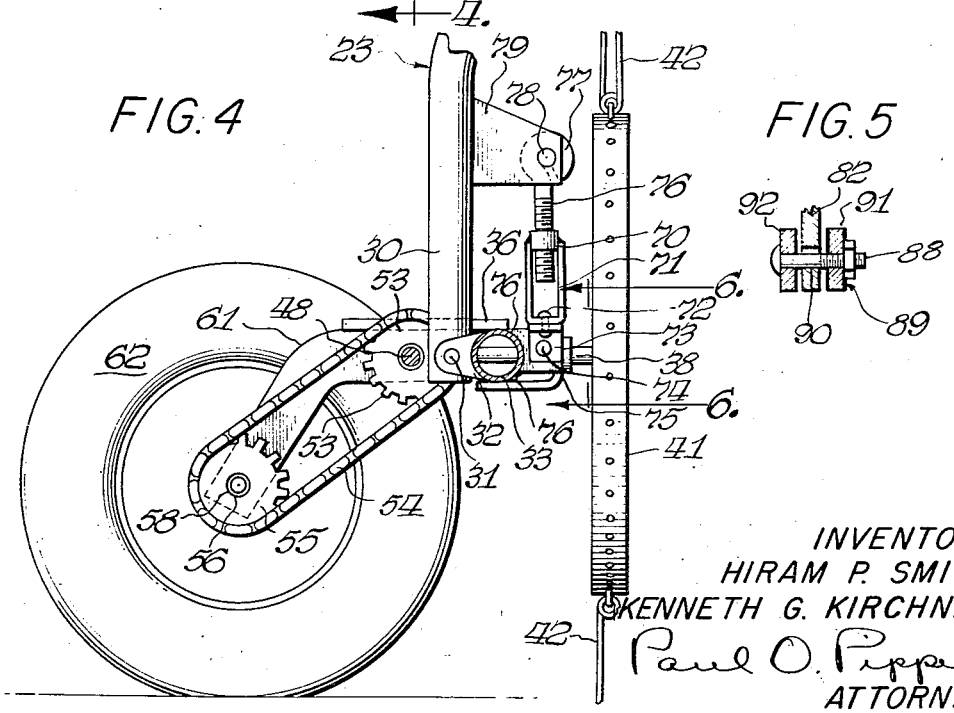
Figure 4 is a further transverse vertical sectional view taken substantially on the line 4—4 of Figure 3.

It will be observed that the rake unit 24 is actuated by a ground drive wheel 62 which is connected to the shaft 56 and adapted, through the transmission heretofore described, to rotate the raking wheels in the direction shown by the arrows in Figure 4.

The leftward side of each unit 24 is supported at its rear upon the wheel 62 and the rightward side is supported by a caster wheel assembly 64 which is mounted on a transverse axle 64' on an arm 65 which is provided with an upright spindle 66 journaled in a sleeve 67 which is integrally connected as by welding to the rear extremity of the mounting arm 50.

It will be seen, particularly from a consideration of Figure 4, that the rake assembly is tiltable about the pin 31 by a turnbuckle type of an adjustment means 70 ahead of the leg 30 of the arch member which comprises a U-shaped element 71 which is rotatably connected as by a rivet 72 to the angle member 73 which is pivoted on an axis substantially parallel to the axis of the pin 31 as by pin 74 to the forwardly extending lug 75 which is welded as at 76 to the forward side of the cross beam member 33. The rivet 72, of course, provides a vertical or an upright axis of rotation for the U-shaped element which is threaded on the shank 76 of the eyebolt 77 which has its eye portion pivotally connected as by pin 78 on a substantially horizontal axis which is substantially parallel to the axes of the pins 74 and 31, the pin 78 being connected to the forwardly projecting lug 79 which is integrally connected with the leg 30 of the arch member 24 adjacent to the upper end thereof. It will be observed that rotation of the nut portion 71 will effect fore and aft canting movement of the rake assembly.

Figure 3:
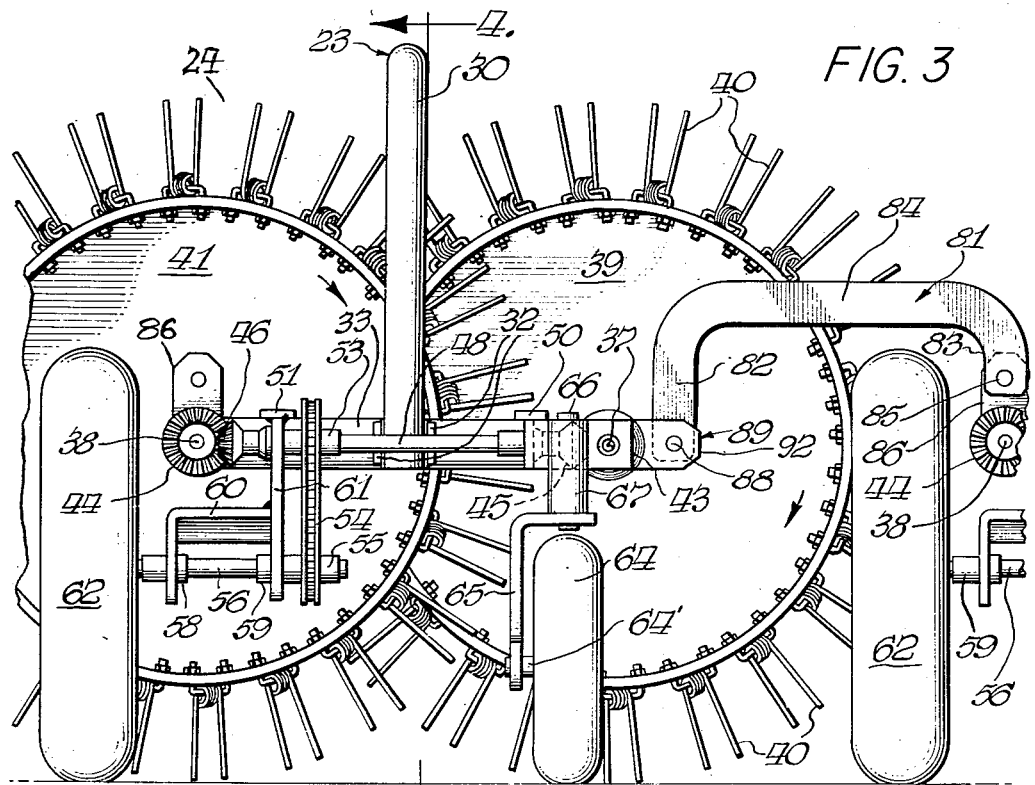
Figure 3 is a fragmentary enlarged rear view as indicated by the line 3—3 of Figure 1.
Figure 5:
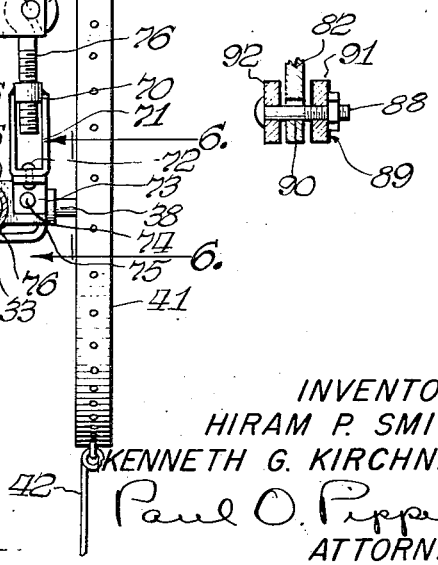
Figure 5 is an enlarged sectional view taken substantially on the line 5—5 of Figure 1.

It will be observed that adjacent sections are interconnected by a transversely extending jockey or arch bar member 81 which at its ends has depending leg portions 82 and 83 interconnected by a bight member 84 (Figure 3). The lower end of the leg 83 is connected on a fore and aft axis as by a generally horizontal pin 85 to an upstanding lug structure 86 formed integral with the member or holder 36 of the unit 24 which is disposed rightwardly thereof as seen in Figure 3. The leg 82 is pivotally connected by substantially horizontal fore and aft exending axis as by pin 88 (Figures 3 and 5) which is connected to a laterally outwardly extending lug structure 89 which is formed integral with the holder member 35 of the unit 24 disposed leftwardly thereof. This structure is shown more particularly in Figure 5 wherein it will be seen that the aperture 90 through which passes the nut and bolt assembly 88 is of slightly larger diameter than the pin 88 and that the ears 91 and 92 of the lug structure 89 are spaced from the leg portion 82 whereby the adjacent units may tilt back and forth, that is fore and aft, and may float vertically with respect to each other.

It will be understood that the beam member 3 may be made of any desired length and that the units 24 which are of identical construction are merely arranged laterally with respect to each other and slightly rearwardly of each other from the rightward to the leftward end of the unit and that in order to compensate for this slight rearward displacement of the respective units the beam member 3 is angled rearwardly from its rightward toward its leftward end whereby all of the arch beam members 23 are, therefore, of identical length.

What is claimed is:

1. A side delivery rake comprising a draft frame including a transverse beam member and a hitch frame connected to said member and extending forwardly therefrom for connection to an associated vehicle, a plurality of substantially identical rake units arranged in echelon formation behind said beam member and each comprising a wheel-supported frame structure including a fore and aft extending arch bar having a forward end extending to adjacent said transverse beam member, and universal connecting means on said beam member spaced lengthwise thereof on the order of lateral spacing of said rake units and connecting the front end of the arch bar thereadjacent to the beam member, and rigid means extending between adjacent units, and means movably connecting said rigid means with respective units to accommodate relative vertical movements therebetween, and each wheel supported frame structure including a transverse main beam member, wheel means disposed in direct supporting relationship thereto, rake means carried by said main beam member, each arch bar having a generally upright rear leg portion, means pivotally connecting the leg portion with the associate main beam on a generally horizontal transverse axis, and means adjustably connecting each main beam member with the related arch bar for pivoting the same relative to each other about their pivotal connection and maintaining the same in selected adjusted position.

2. In a side delivery rake; a draft frame adapted for connection to an associated prime mover, a plurality of self-contained raking units arranged in echelon and disposed in trailing relation to said draft frame, each unit including a transverse main beam member, wheel means supporting said beam member, a fore and aft extending arch bar having a rear end disposed behind and connected to said main beam member intermediate the ends thereof, a pair of raking wheels disposed in upright planes in echelon arrangement ahead of said main beam member and beneath said arch bar, means rotatably mounting said rake wheels at opposite ends of the main beam member and operatively connected to said wheel means for driving said rake wheels, said arch bar having a forward end adjacent to the draft frame, said draft frame elongated transversely of the direction of movement of the rake, and means providing a universal connection between said forward end of the arch bar and said draft frame at a point directly ahead of the associated raking unit.

3. The invention according to claim 2, and rigid means extending between and interconnecting adjacent units to maintain the same in laterally spaced relation and said rake wheels of each unit and of adjacent units being disposed in overlapping relationship.

4. A side delivery rake unit having a transverse main frame member, a plurality of individual upright rake wheels, positioned ahead of said frame member in an overlapping echelon arrangement, means individually rotatively mounting each rake wheel on said member on a fore and aft axis for vertical movement with said member, means including a pair of laterally spaced ground wheels disposed in supporting relation to said member rearwardly thereof, a power transmission operatively connecting a ground wheel with said first-mentioned means for driving the rake wheels attendant to forward movement of the unit, a fore and aft arch bar extending over said rake wheels and having a downwardly extending rear portion with a lower end pivoted to said main beam member on a generally horizontal transverse axis, said arch bar having a downwardly and forwardly inclined forward portion for connection to associated draft means, and means operatively interconnecting said rear portion of the arch bar and said member for selectively changing the angular relationship therebetween about their pivotal connection for adjusting the fore and aft inclination of said rake wheels.

5. The invention according to claim 4 and attaching means connected to opposite ends of said member for connection of said unit to associated units at either side thereof.

References Cited in the file of this patent

UNITED STATES PATENTS

| 2,153,876 | Roseman | Apr. 11, 1939 |
| 2,657,519 | Hill | Nov. 3, 1953 |

FOREIGN PATENTS

| 71,998 | Switzerland | Mar. 16, 1916 |
| 109,094 | Great Britain | Aug. 30, 1917 |